(12) United States Patent
Scheck

(10) Patent No.: US 8,033,373 B2
(45) Date of Patent: Oct. 11, 2011

(54) FORCE TRANSMISSION SYSTEM, IN PARTICULAR FOR A DRIVE SYSTEM OF AN ADJUSTING ELEMENT OF A MOTOR VEHICLE

(75) Inventor: Georg Scheck, Weitramsdorf (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 12/467,741

(22) Filed: May 18, 2009

(65) Prior Publication Data

US 2009/0266672 A1   Oct. 29, 2009

Related U.S. Application Data

(63) Continuation of application No. PCT/EP2007/009079, filed on Oct. 19, 2007.

(30) Foreign Application Priority Data

Nov. 16, 2006  (DE) ...................... 20 2006 017 482 U

(51) Int. Cl.
*F16D 41/20* (2006.01)
(52) U.S. Cl. .................................. 192/223.4; 188/77 W
(58) Field of Classification Search ................ 192/223.4
See application file for complete search history.

(56) References Cited

U.S. PATENT DOCUMENTS

| | | | |
|---|---|---|---|
| 2,498,843 A | 2/1950 | Pile | |
| 5,806,246 A | 9/1998 | Azuma | |
| 6,095,312 A | 8/2000 | Schumann | |
| 6,871,735 B2 | 3/2005 | Kawai et al. | |

FOREIGN PATENT DOCUMENTS

| | | |
|---|---|---|
| DE | 9409014 U1 | 9/1995 |
| DE | 19653722 C2 | 6/2000 |
| DE | 19907483 A1 | 8/2000 |
| DE | 19933285 A1 * | 1/2001 |
| DE | 10312499 A1 * | 9/2004 |
| DE | 102005012938 A1 | 9/2006 |
| DE | 19607552 B4 | 10/2006 |
| GB | 631131 A | 10/1949 |
| GB | 1047814 A | 11/1966 |
| WO | 2006100174 A1 | 9/2006 |

OTHER PUBLICATIONS

German Search Report dated Jul. 26, 2007.
International Search Report dated Mar. 3, 2008.

* cited by examiner

*Primary Examiner* — David D Le
*Assistant Examiner* — Ryan Dodd
(74) *Attorney, Agent, or Firm* — Laurence A. Greenberg; Werner H. Stemer; Ralph E. Locher

(57) ABSTRACT

In a force transmission system with a wrapping spring-type wraparound element and with a frictional surface assigned to the wraparound element, a switching device is provided for switching the wraparound element between two switching states is provided. In the first switching state, the wraparound element is operatively connected in a force-transmitting manner to the frictional surface. In the second switching state, it is operatively connected thereto in a non-force-transmitting manner. In the second switching state, the wraparound element is fully lifted off the frictional surface. The force transmission system is suitable in particular for a drive system of an adjusting element of a motor vehicle.

9 Claims, 1 Drawing Sheet

FORCE TRANSMISSION SYSTEM, IN PARTICULAR FOR A DRIVE SYSTEM OF AN ADJUSTING ELEMENT OF A MOTOR VEHICLE

CROSS-REFERENCE TO RELATED APPLICATION

This is a continuation, under 35 U.S.C. §120, of copending international application No. PCT/EP2007/009079, filed Oct. 19, 2007, which designated the United States; this application also claims the priority, under 35 U.S.C. §119, of German application No. DE 20 2006 017 482.6, filed Nov. 16, 2006; the prior applications are herewith incorporated by reference in their entirety.

BACKGROUND OF THE INVENTION

Field of the Invention

The invention relates to a force transmission system, in particular for transmitting a driving force between a drive side and an output side of a drive system for an adjusting element of a motor vehicle. The force transmission system has a wraparound element which is assigned a frictional surface, and switching means for switching the wraparound element between a first switching state and a second switching state. In the first switching state, the wraparound element is operatively connected in a force-transmitting manner to the frictional surface. In the second switching state, the wraparound element is operatively connected to the frictional surface in a non-force-transmitting manner.

A force transmission system of the type, which is known, for example, from the commonly assigned German published patent application DE 199 07 483 A1, can be coupled on the drive side to a drive system and on the output side to an adjusting element of a motor vehicle, which is also referred to for short below as motor vehicle adjusting system. The drive system preferably has an electric motor which is customarily coupled within a force flux to the output-side adjusting element via a gear serving to step up the force. The adjusting element may be a closing part which is coupled to a vehicle body or is guided slidably in relation thereto, for example a tailgate, a sliding roof, a vehicle window, a vehicle door, a trunk cover or an engine compartment cover, and is intended for closing an opening in the body.

The force transmission system connected between the drive system and the output-side adjusting element is intended firstly to transmit a driving force or a drive torque produced on the drive side to the output-side adjusting element. The force transmission system is intended secondly to decouple or block an adjusting movement, which is effective from the output side, toward the drive side. A wraparound element which is in the manner of a wraparound spring, interacts with an assigned frictional surface and can be switched between a force-transmitting and a non-force-transmitting switching state is suitable for this purpose.

SUMMARY OF THE INVENTION

It is accordingly an object of the invention to provide a force transmission system, which overcomes the above-mentioned disadvantages of the heretofore-known devices and methods of this general type and which provides for a simply constructed mechanical force transmission system which is particularly suitable, firstly, for a reliable transmission of force between the drive and the output and, secondly, for reliably decoupling the output from the drive, while being as efficient as possible at the same time. The force transmission system is intended to be suitable in particular for the motorized actuation of an adjusting element of a motor vehicle.

With the foregoing and other objects in view there is provided, in accordance with the invention, a force transmission system, comprising:

a wraparound element and a frictional surface assigned to the wraparound element;

a switching device configured to switch the wraparound element between a first switching state and a second switching state, wherein the wraparound element is operatively connected in a force-transmitting relationship with the frictional surface in the first switching state, and the wraparound element is operatively connected to the frictional surface in a non-force-transmitting relationship in the second switching state;

a torque-controlled lever arm for fully lifting the wraparound element off the frictional surface in the second switching state, the lever arm being formed by a distance, effective at the switching device, between a drive-side bearing point and an output-side tilting point.

In other words, the objects of the invention are achieved with the force transmission system that comprises a wraparound element with an assigned frictional surface and means for switching the wraparound element between two switching states, wherein the wraparound element is operatively connected in a force-transmitting manner to the frictional surface in a (first) switching state and is operatively connected in a non-force-transmitting manner to a wraparound element fully lifted off the frictional surface in a different (second) switching state. The wraparound element is lifted off the frictional surface in the second switching state by way of a torque-controlled lever arm.

In accordance with an added feature of the invention, the wraparound element is configured to be braced against a frictional surface of a component and the frictional surface is rotationally symmetrical about a central system axis.

In accordance with an additional feature of the invention, the switching device includes a lever-type coupling element. Preferably, the wraparound element is formed with mutually spaced-apart spring ends, and the coupling element is connected with the spaced-apart spring ends of the wraparound element. In an advantageous embodiment of the invention, there is provided a drive element effective to act on the coupling element and an output element effective to act on the coupling element, and wherein a driving force is transmitted to the output element via the switching device with a reduction of an effective diameter of the wraparound element.

In accordance with another feature of the invention, in the case of a frictional surface formed by the inner wall of a hollow cylindrical component, the switching means interact with the spring ends of the wraparound element in such a manner that, in the first switching state, an output force introduced via an output element is blocked by the wraparound element being braced against the frictional surface, and in that, in the second switching state, a driving force introduced via a drive element leads to the wraparound element being released such that the driving force is transmitted to the output element without friction between the wraparound element and the frictional surface.

In accordance with a further feature of the invention, there are provided bearing means disposed to support the wraparound element in the second switching state. Preferably, the bearing means are formed by a bearing contour of the drive element, and the bearing contour faces the wraparound element.

In accordance with a concomitant feature of the invention, the system is configured in a symmetrical construction such that the first and second switching states are switchable independently of a direction of rotation.

The wraparound or frictionally engaged element of the novel force transmission system may be a wraparound spring with a number of coils. The wraparound element is expediently assigned a cylindrical or hollow cylindrical frictional surface which is rotationally symmetrical about a central system spindle. The wraparound element may also be a wraparound belt, a wraparound link chain, a wraparound cable or the like.

The switching means provided for switching the wraparound element bring about a change between two switching states. In a (first) switching state, the wraparound element and the frictional surface are operatively connected in a force-transmitting manner, the connection being produced by frictional engagement, without any relative movement between the wraparound element and the frictional surface. In the other (second) switching state, the wraparound element and the frictional surface are not operatively connected in a force-transmitting manner since the wraparound element is fully lifted off the frictional surface.

In a (first) switching state, a driving force can be coupled to the output side or can be transmitted thereto if the frictional engagement is produced between the wraparound element and an output element having the frictional surface or forming the latter. In the other (second) switching state, full decoupling between the drive side and the output side of the force transmission system is then produced such that an output-side adjusting element is freely movable without reaction on the drive side. This embodiment, in which the second switching state represents the starting or inoperative position of the force transmission system, is suitable particularly for a door drive of a motor vehicle if a motor vehicle door, which is moved by motor via the force transmission system into the open position, is to be movable back manually into the closed position in a manner virtually free from force, i.e., without a counterforce being generated by the force transmission system.

Accordingly, an output force can be blocked in a (first) switching state if the frictional engagement is produced with an expediently rotationally fixed component or housing. In the other (second) switching state, in which the wraparound element is then lifted off the frictional surface, a driving force can be transmitted to the output side in a manner free from friction. This alternative, in which the first switching state represents the starting or inoperative position of the force transmission system, is suitable, for example, for a tailgate drive of a motor vehicle since, owing to the braking or blocking function of the force transmission system in the first switching state, an automatic movement back of the tailgate, which is moved by motor into an open position, is reliably prevented.

In an expedient development, the force transmission system comprises a drive element for coupling to an output element for connection to a motor vehicle adjusting element. A driving force can therefore be transmitted to the output element via the switching means in a manner free from friction and with a reduction in the effective diameter of the wraparound element.

The wraparound element interacts with the rotationally symmetrical frictional surface of the component in such a manner that, owing to a contact pressure force or frictional force which is generated as a result of the wraparound element being prestressed or braced, a movement relative to the frictional surface is prevented in the first switching state. For this purpose, the wraparound element expediently has pre-stressable spring coils, with the respective coil or spring ends being spaced apart from one another. In the case of a frictional surface which is formed by a hollow cylindrical component and is therefore on the inner wall, the wraparound element is prestressed by the outside diameter of the wraparound element being larger than the inside diameter of the hollow cylindrical component.

In the case of the interior wraparound spring and with a frictional surface which is formed by the inner wall of a hollow cylindrical component or hollow body and is rotationally symmetrical about a central system spindle, mutually spaced-apart and inwardly angled spring ends of the wraparound element are connected or coupled to each other via a coupling element which is effective as a switching means and is in the form of a reinforcement or transmission lever. Said lever-like switching means interacts with the spring ends of the wraparound element in such a manner that, in the first switching state, an output force can be supported by the wraparound element being braced against the frictional surface in the hollow cylindrical component or housing while, in the second switching state, a driving force is released by the wraparound element being fully detached from the frictional surface.

A torque-controlled lever arm is provided for fully lifting the frictionally engaged element in the form of the interior wrapping spring off the frictional surface in the second switching state. The lever arm is expediently formed by a spacing distance, which is effective at the switching means or at the lever-like coupling element, between a drive-side bearing point and an output-side tilting point. The switching means or the coupling element is then expediently designed as a lever extending centrally.

In said torque-controlled force transmission system, the wraparound element is supported in the second switching state on bearing means which are preferably formed by a bearing contour of the drive element, said bearing contour facing the wraparound element which is then expediently designed as a wraparound spring. The bearing means or supporting means stabilize, fix and center the position of the wraparound element in relation to the frictional surface in the second switching state if the wraparound element is fully lifted off the frictional surface by interaction with the switching means, i.e. with the coupling element and also with the drive element and with the output element.

The force transmission system which is effective as a torque-controlled wraparound element brake, in particular as a wraparound spring brake, is expedient, for example, for a non-self-locking drive system. The driving force is thereby transmitted from the drive side to the output side of the force transmission system by the drive element being coupled via the coupling element which is effective as the switching means. In the (second) switching state, in which the interior wraparound element (wrapping spring) is not operatively connected to the frictional surface, and a driving force is coupled or can be coupled to or into the output side of the force transmission system, the braking function of the force transmission system is ineffective. The force flux can therefore be transmitted from the drive system to the motor vehicle adjusting element in a manner free from friction.

In the first switching state, in which the wraparound element is operatively connected to the frictional surface in a force-transmitting manner, the output torque or the output force which is effective in the opposed direction of transmission from the output side is supported in the rotationally fixed, hollow cylindrical component or hollow body which forms the rotationally symmetrical frictional surface and is therefore, as it were, blocked. In this first switching state, the braking function is effective, and therefore the force transmission system blocks the output force.

Although a certain amount of prestressing of the wraparound element is already produced by a plurality of spring coils of the internal wraparound spring being braced against the frictional surface, an additional force for bracing the wraparound spring can preferably be injected into the force transmission system by means of the coupling element which is effective as a reinforcement or transmission lever. Since the coupling element which is assigned to the switching means or is effective as such is held jointly at both spring ends of the wraparound element, an application of force is transmitted to the coupling element as the result of the lever action thereof with corresponding division of force to both coil or spring ends in the direction of increasing bracing of the wraparound element against the frictional surface and therefore the bracing of said wraparound element against the frictional surface is reinforced. Analogously, the lever-type coupling element acts on both spring ends when the wraparound element is lifted off the frictional surface.

The force transmission system is of symmetrical construction such that the two switching states are set in each direction of rotation of the switching means and of the wraparound element interacting therewith. Therefore, in the particular switching state, a driving force can be switched independently of the direction of rotation with the effect of being coupled into the output side of the force transmission system. In addition, in the respectively other switching state and independently of the direction of rotation, either an output force can be blocked or the output of the force transmission system is fully released.

As a result of the wraparound element being fully lifted off the frictional surface, in the second switching state no frictional losses occur in the case of the torque-controlled or centrifugally controlled wraparound element brake with the internal wraparound element. The reason for this is that, in that switching state in which the wraparound element lies opposite the frictional surface serving as a friction partner in a non-force-transmitting manner, there is no mechanical contact between the friction partners that could cause a movement of the friction partners relative to each other in a manner effected by sliding friction and therefore producing a grinding effect.

The force transmission system firstly fulfils the object, in the case of a motorized actuation of the motor vehicle adjusting element, in particular into the open position, of transmitting the force flux from the drive side (drive) to the output side (output) with a driving force sufficient to actuate the adjusting element. Secondly, in the second switching state with the wraparound element fully lifted off the frictional surface, the force transmission system is free from loss of frictional and is particularly quiet. In addition, the force transmission system is particularly suitable for reliably blocking an output force acting from the output side (output) toward the drive side (drive) with the effect of decoupling or uncoupling said force.

The advantages obtained by the invention therefore consist in particular in that, as the result of a complete lifting, which is brought about by switching means, of a wraparound element from a frictional surface assigned thereto, there is provided a force transmission system which is particularly quiet and low in frictional losses, in particular for a drive system of a motor vehicle adjusting element, preferably for an electric tailgate drive or door drive.

In other words: in order to avoid running noises and/or frictional losses, according to the invention a frictionally engaged connection which can be switched using switching means controlled by the operating conditions is provided, said switching means, at above a certain, mechanically caused torque, causing a wraparound element, in particular a wraparound spring, to be fully lifted off a frictional surface assigned to said wraparound element or wraparound spring and therefore causing a frictionally engaged connection produced by such friction partners to be fully detached in a manner free from sliding friction.

Other features which are considered as characteristic for the invention are set forth in the appended claims.

Although the invention is illustrated and described herein as embodied in a force transmission system, in particular for a drive system of an adjusting element of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
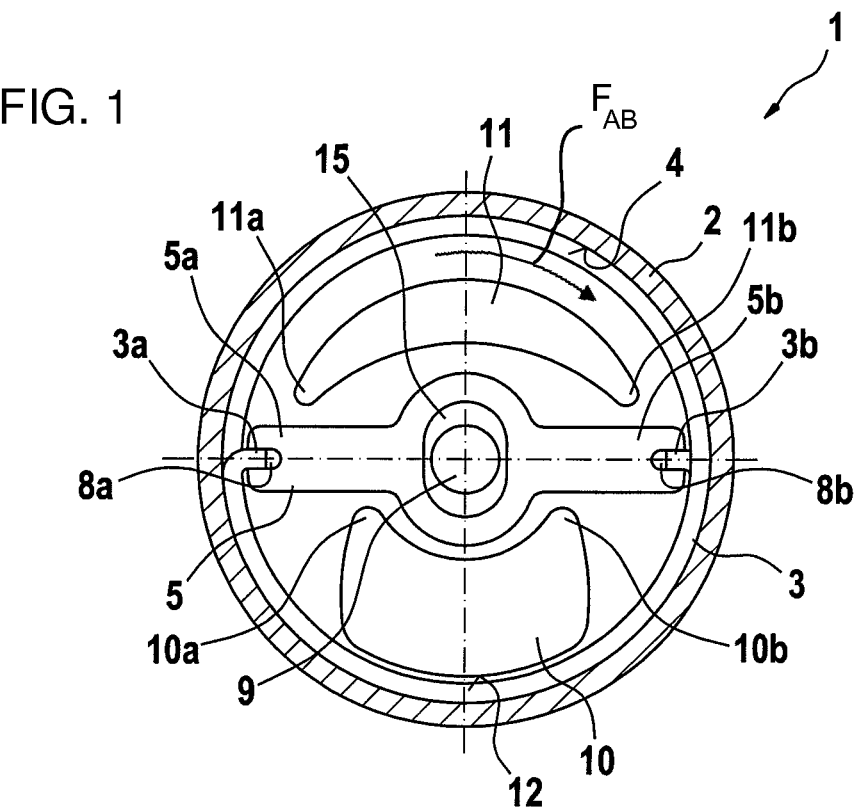
FIG. 1 is a schematic view of a force transmission system that is effective as a torque-controlled wraparound spring brake, in a drive-free starting state.

Referring now to the figures of the drawing in detail, and first, particularly, to FIG. 1 thereof, there is shown a schematic cross section through a force transmission system 1 with a hollow cylindrical or hollow-shaft-like component 2 referred to below as a housing. A wraparound element in the form of a wraparound spring 3 having a plurality of coils or spring coils is inserted under prestress into the housing 2 and is connected thereto non-positively, i.e., with a force lock, or in a frictionally engaged manner. For this purpose, the wraparound spring 3 has, in the starting state, an outside diameter which is larger than the inside diameter of the housing 2. The inner wall of the housing 2 is assigned to the wraparound spring 3 as a frictional surface 4. The wraparound spring 3 has spring ends 3a and 3b which are angled inwardly and therefore project into the interior of the housing 2.

The spring ends 3a, 3b of the wraparound spring 3 are connected to each other via a coupling element 5 which is effective as the switching means and as the reinforcement or transmission lever. For the common connection of the spring ends 3a, 3b of the wraparound spring 3 to the coupling element 5, the latter is provided with recesses or receiving openings 8a, 8b in which the respective spring end 3a or 3b engages or into which said spring end is guided.

Figure 2:
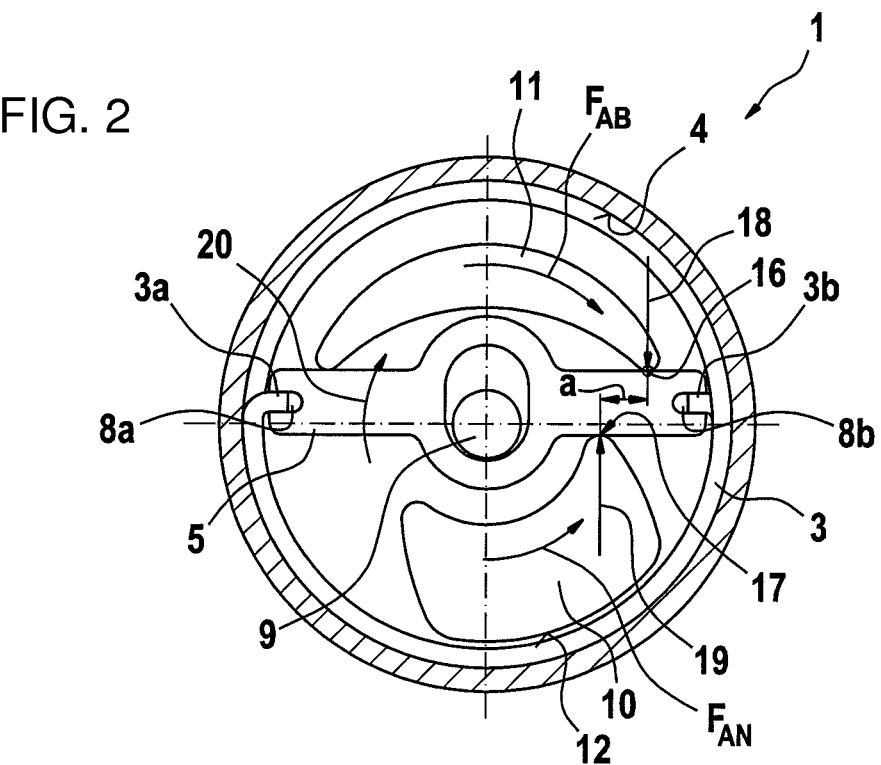
FIG. 2 shows the force transmission system according to FIG. 1 in the driven switching state.

The force transmission system 1 according to FIGS. 1 and 2 is controlled in terms of its operation with regard to the switching state with a non-force-transmitting action between the wraparound spring 3 and the frictional surface 4 to the effect that the wraparound spring 3 is fully lifted off the frictional surface 4. For this purpose, the force transmission system 1 is effective as a torque-controlled wraparound spring brake. The lever-type coupling element 5 which acts as the switching means is embodied to extend centrally.

A drive element 10 and an output element 11 are arranged on the central spindle 9. The drive element 10 and the output element 11 are disposed inside the housing and inside the wraparound spring 3 on opposing sides of the coupling element 5. The drive element 10 comprises bearing contours 10a and 10b facing the respective spring ends 3a, 3b of the wraparound spring 3. The output element analogously has bearing or stop contours 11a and 11b respectively facing the spring ends 3a, 3b of the wraparound spring 3. The drive element 10 furthermore contains a bearing or supporting contour 12 facing the wraparound spring 3.

The coupling element 5 is disposed on the central axle 9 by way of an oblong hole 15 and held at the two spring ends 3a and 3b of the wraparound spring 3.

As is quite clearly apparent from FIG. 2, the bearing contours 11a, 11b of the output element 11 and the bearing contours 10a and 10b of the drive element 10 are positioned along the reinforcement lever or coupling element 5 at a distance a. As a result, a corresponding lever arm a is formed between a bearing point, which is referred to below as tilting point 16, between the output element 11 and the coupling element 5 and a bearing point 17 formed between the drive element 10 and the coupling element 5. Owing to the again symmetrical construction of the force transmission system 1, said lever arm a is formed on both sides of the central spindle 9 between the output element 11 and the coupling element 5, on one side, and between said coupling element and the drive element 10, on the other side.

An output force $F_{AB}$ effective from the output or from the output side or a corresponding output torque is blocked with the effect of uncoupling, decoupling or switching off such that the force transmission system 1 blocks a transmission of force or torque to the drive side. An output force $F_{AB}$ acting on the output element 11 thus leads in both directions of rotation to the corresponding shoulder contour 11a, 11b of the output element 11 bearing against the corresponding lever end 5a or 5b of the coupling element 5, with the result that the wraparound spring 3 is increasingly braced via the spring ends 3a and 3b thereof against the frictional surface 4. Transmission of the output force $F_{AB}$ to the drive element 10 is therefore reliably prevented. The force transmission system 1 according to FIG. 1 is therefore suitable particularly for a non-self-locking drive or drive system.

Owing to the prestressing of the wraparound spring 3 in that switching state of the force transmission system 1 which is illustrated in FIG. 1 and corresponds to the starting state, and owing to the reinforcing effect of the coupling element 5, an output force (output torque) $F_{AB}$ on the output element 11 leads in both directions of rotation, and therefore independently of the direction of rotation, to a blocking of the force transmission system 1 with a corresponding, force-transmitting operative connection between the wraparound spring 3 and the frictional surface 4. In this case, the output force $F_{AB}$ is introduced into the positionally fixed or fixed housing 2. Transmission of said output force $F_{AB}$ to the drive element 10 is therefore avoided in this switching state, since, owing to the already braced frictionally engaged state and frictional engagement, which is reinforced as the output force $F_{AB}$ increases, between the wraparound spring 3 and the frictional surface 4 or the housing 2, no relative movement between said friction partners takes place.

If, by contrast, a driving force or a drive torque $F_{AN}$ acts on the drive element 10 in one of the two directions of rotation, for example in the direction of rotation illustrated, then first of all the corresponding stop contour 17 of the drive element 10 is brought by the driving force $F_{AN}$ indicated by the arrow 18 against the coupling element 5 at the bearing point 17.

Owing to the coupling element 5 being guided via the oblong hole 15 thereof, which is in the manner of an elongated hole, the coupling element 5 is first of all displaced in the direction of the output element 11, with the effect that the two spring ends 3a and 3b of the wraparound spring 3 are already lifted off the frictional surface 4 in the direction of decreasing wraparound spring diameter. As soon as the coupling element 5, which is again effective as the switching means, bears against the output element 11 at the tilting point 16 under the effect of the output force or counterforce $F_{AB}$ indicated by the arrow 19, torque or a rotary lever action is produced via the lever arm a in the direction of the arrow 20 and therefore in the opposite direction to the drive torque or to the driving force $F_{AN}$. In this switching state, said additional torque brings about full lifting of the wraparound spring 3 off the frictional surface 4. In this case, the wraparound spring 3 is again supported on the bearing or supporting contour 12 of the drive element 10 such that the wraparound spring 3 is reliably prevented from bearing on the side lying opposite the drive element 10 against the frictional surface 4. The bearing or supporting contour 12, therefore, effects an additional stabilization and centering of the wraparound spring 3 within the housing 2 in this switching state.

The spring prestress, which depends on the wire diameter of the spring windings and on the diameter difference between the wraparound spring 3 in the installed and non-installed positions, respectively, determines the release force of the wraparound spring 3 for its full and complete lifting off from the friction surface.

With the force transmission system 1 in its implementation as a wraparound spring brake, virtually no frictional losses or any running noises are caused because the wraparound spring 3, which is used as the wraparound element, is fully lifted off the associated frictional surface 4 in the corresponding switching state. The control or change between one switching state of the force transmission system 1 with a force transmission action between the friction partners formed from the wraparound spring 3 and the frictional surface 4 and another switching state without a force transmission action between said two friction partners 3 and 4 takes place by means of a predetermined, specific or directed torque control in accordance with the operating conditions. Accordingly, reliable transmission of a driving force (drive torque) $F_{AN}$ to the output side of the force transmission system 1 of a coupling in or switching on effect is possible in each case in one of the two switching states.

In the respectively other switching state, an output force (output torque) $F_{AB}$ from the output side to the drive side can be reliably blocked within the concept of a blocking of the force transmission system 1.

In summary, a frictionally engaged connection which is produced by means of the wraparound element 3, which is preferably in the manner of a wraparound spring, and which can be switched in a controlled manner firstly brings about a force-transmitting operative connection which is effective for reliably blocking or decoupling an effective output force (output torque) $F_{AB}$ or for reliably transmitting or coupling a driving force (drive torque) $F_{AN}$, produced in particular by an electric motor, to or into the output side of a mechanical force transmission system 1. Secondly, the frictionally engaged connection, which can be switched in a controlled manner, brings about an operative connection which is not only non-force-transmitting but is also free from friction between the friction partners, which is effective for particularly reliable transmission or coupling of a driving force (drive torque) $F_{AN}$, which is produced in particular by electric motor, to or into the output side of a mechanical force transmission system 1, or for complete and friction-free decoupling of the output side from the drive side of the force transmission system 1. Owing to the avoided or at least particularly low frictional losses in the second switching state, in which the wraparound element 3 is fully lifted off the frictional surface 4 assigned thereto, all in all a particularly high degree of efficiency of the force transmission system 1 is achieved.

The force transmission system 1, which comprises a drive element 10 and an output element 11, 2' for transmitting a driving force $F_{AN}$ from the drive to the output, and a wraparound element 3 arranged between the drive element 10 and the output element 11, 2', and which, for a particularly quiet and low-loss operation, interacts with switching means 5, 10, 11, 14 in order to produce a frictionally engaged connection between the wraparound element 3 and the assigned frictional surface 4 and in order to detach the frictionally engaged connection by fully lifting the wraparound element 3 off the frictional surface 4, can therefore be used particularly advantageously in or for a drive system of an adjusting element of a motor vehicle.

The invention claimed is:

1. A force transmission system, comprising:
a wraparound element and a frictional surface assigned to said wraparound element;
a switching device configured to switch said wraparound element between a first switching state and a second switching state, said wraparound element being operatively connected in a force-transmitting relationship with said frictional surface in said first switching state, and said wraparound element being operatively connected to said frictional surface in a non-force-transmitting relationship in the second switching state, said switching device including a lever-type coupling element, a drive element, and an output element, said drive element being effective to act on said coupling element at a drive-side bearing point and said output element being effective to act on said coupling element at an output-side tilting point;
a torque-controlled lever arm for fully lifting said wraparound element off said frictional surface in the second switching state, said lever arm being formed by a distance, effective at said switching device, between said drive-side bearing point and said output-side tilting point.

2. The force transmission system according to claim 1, wherein said wraparound element is configured to be braced against a frictional surface of a component and said frictional surface is rotationally symmetrical about a central system spindle.

3. The force transmission system according to claim 1, wherein said wraparound element is formed with mutually spaced-apart spring ends, and said coupling element is connected with said spaced-apart spring ends of said wraparound element.

4. The force transmission system according to claim 1, wherein a driving force is transmitted to said output element via said switching device with a reduction of an effective diameter of said wraparound element.

5. The force transmission system according to claim 1, wherein, in the case of a frictional surface formed by the inner wall of a hollow cylindrical component, the switching device interacts with the spring ends of the wraparound element in such a manner that, in the first switching state, an output force introduced via an output element is blocked by the wraparound element being braced against the frictional surface, and in that, in the second switching state, a driving force introduced via a drive element leads to the wraparound element being released such that the driving force is transmitted to the output element without friction between the wraparound element and the frictional surface.

6. The force transmission system according to claim 5, which comprises bearing means disposed to support said wraparound element in the second switching state.

7. The force transmission system according to claim 6, wherein said bearing means are formed by a bearing contour of said drive element, and said bearing contour faces said wraparound element.

8. The force transmission system according to claim 1, configured in a symmetrical construction such that the first and second switching states are switchable independently of a direction of rotation.

9. The force transmission system according to claim 1, wherein said wraparound element is a wraparound spring.

\* \* \* \* \*